Figure 3:
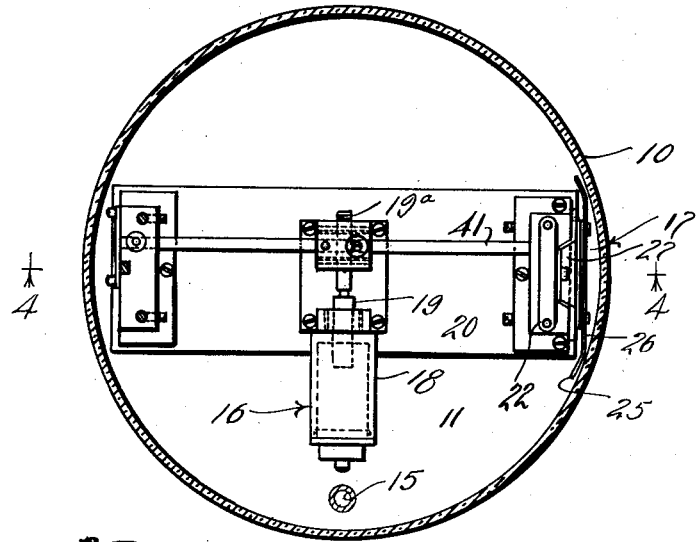

May 9, 1933.      C. J. BASSLER      1,908,302
MEASURING DEVICE
Filed Oct. 23, 1928      2 Sheets-Sheet 1
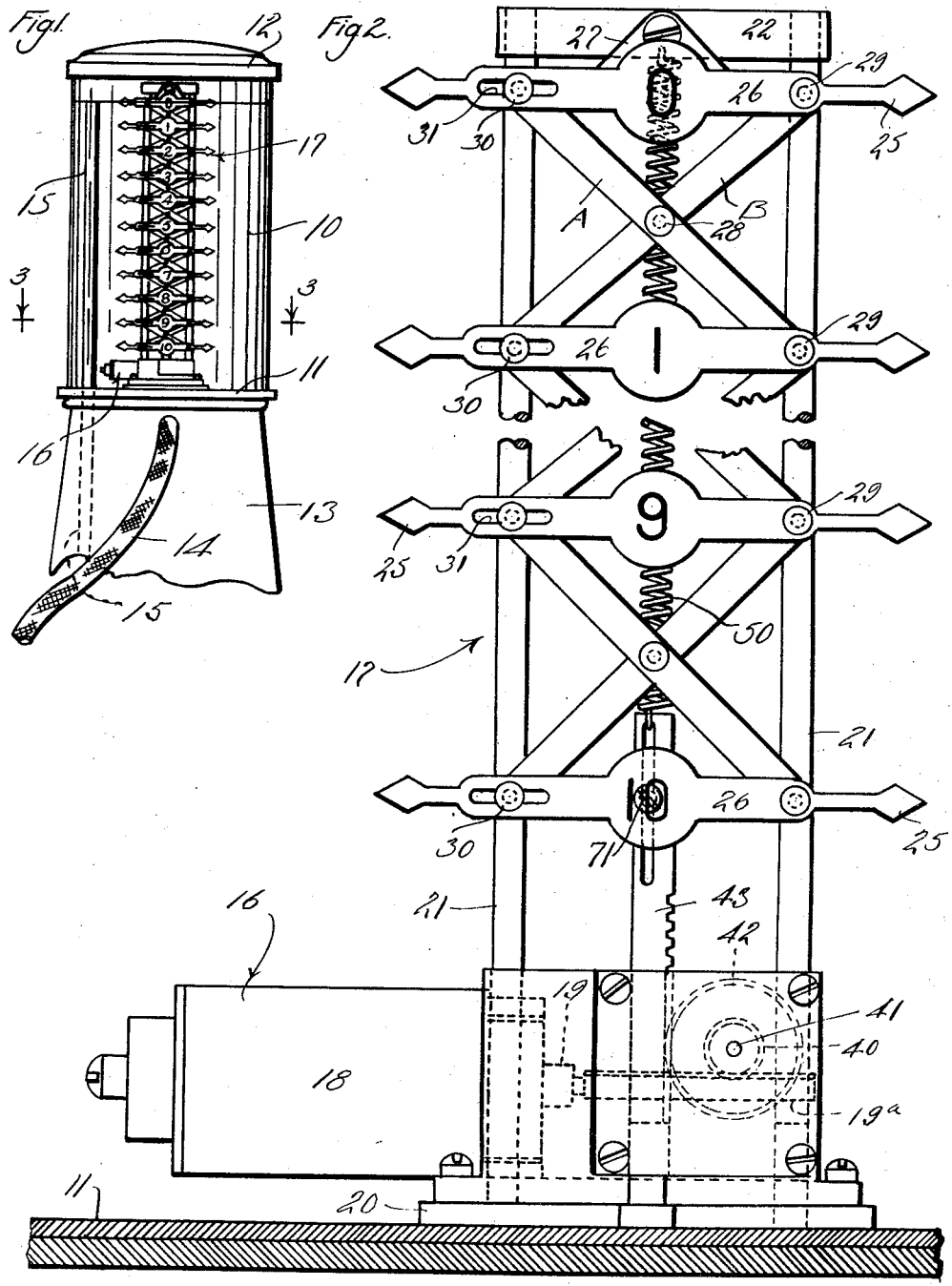
Inventor
Carlos J. Bassler
by H. M. Caldwell
his Attorney May 9, 1933.　　　C. J. BASSLER　　　1,908,302
MEASURING DEVICE
Filed Oct. 23, 1928　　　2 Sheets-Sheet 2

Inventor
Carlos J. Bassler
by
his Attorney

Patented May 9, 1933

1,908,302

UNITED STATES PATENT OFFICE

CARLOS J. BASSLER, OF ALHAMBRA, CALIFORNIA, ASSIGNOR TO AMERICAN LIQUID METER COMPANY, OF ALHAMBRA, CALIFORNIA, A CORPORATION OF WASHINGTON

MEASURING DEVICE

Application filed October 23, 1928. Serial No. 314,431.

This invention has to do with a measuring device and it is an object of the invention to provide a device particularly useful for accurate measurement of liquids.

Quantity in matter is measurable by mass, it being well understood, of course, that volume is not a true factor for use in measuring mass. Mass is conveniently measured by measuring its proportional effect known as weight, and to this end a great variety of weighing means or devices have been developed. Matter in the liquid state does not, under many practical conditions, lend itself to measurement by weight, and therefore measurement by volume is accepted as a practical substitute. In the case of most liquids, however, volume measurement is by no means an accurate measurement of mass as the liquids vary with changes in temperature. For example, 100 gallons of commercial gasoline at 20 degrees Fahrenheit will measure 107 gallons at 120 degrees Fahrenheit. This variation has long been recognized and in handling large volumes of liquids, for instance large quantities of gasoline, the error resulting from volume measurement is taken into account and, by mathematical calculation, suitable adjustments are made. In many cases, however, and particularly in dispensing most liquids to the ultimate consumers, the volume method of measurement alone is used and no correction is made taking into account the temperature of the liquid at the time it is measured.

It is a general object of the present invention to provide a measuring device whereby liquid can be accurately measured as to mass without involving weighing means such as are ordinarily required in accurately measuring mass.

It is a further object of the invention to provide a measuring device such as I have referred to which is simple and inexpensive, making it suitable for general use in handling or dispensing liquids in any quantities.

Another object of the invention is to provide a liquid measuring device involving a thermal compensator operable to automatically correct variation in volume caused by change in temperature.

Another object of the invention is to provide in combination a liquid holding chamber and a variable scale or graduating means operable to proportionately vary the position of a plurality of indicators with reference to the chamber.

Another object of the invention is to provide a combination such as I have just mentioned including thermal control means for the graduating means.

A further object of my present invention is to provide a thermally controlled variable graduating means in combination with a liquid container having a transparent element, the feature of the invention being that the control means be located inside the container so that it is directly influenced by the liquid being measured.

Figure 4:
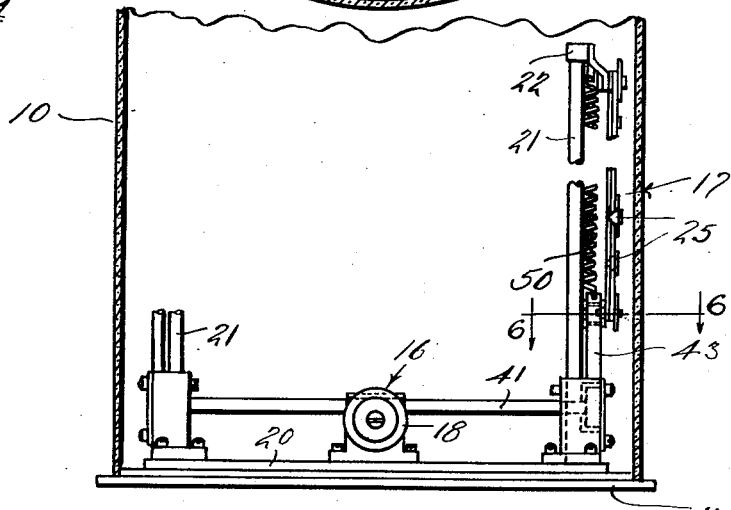
Figure 5:
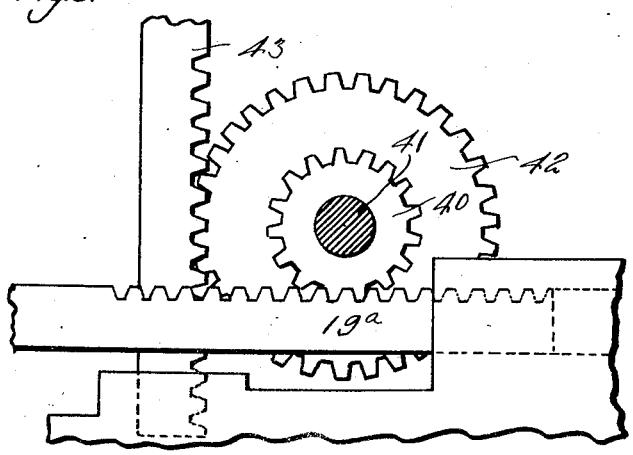
Figure 6:
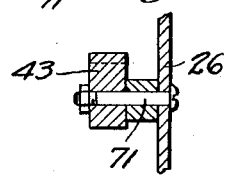

The various objects and features of my invention will be best and more fully understood from the following detailed description of a typical form and application of the invention, throughout which description I refer to the accompanying drawings, in which:

Fig. 1 is a front elevation of a device that I have illustrated for the purpose of showing a typical application of the present invention, the device being a liquid dispensing device of the visible container type. Fig. 2 is an enlarged view illustrating in detail the principal parts of the control unit and variable indicating means. Fig. 3 is an enlarged detailed plan section of the device shown in Fig. 1 being a view taken substantially as indicated by line 3—3 on Fig. 1. Fig. 4 is a vertical sectional view being a view taken as indicated by line 4—4 on Fig. 3. Fig. 5 is an enlarged detailed sectional view illustrating the interconnection provided between the control unit and indicating means and Fig. 6 is an enlarged detailed sectional view taken as indicated by line 6—6 on Fig. 4.

My present invention provides certain fundamental features of construction and combination applicable to numerous situations where liquid or certain fluids are to be measured. The invention resides primarily in certain broad features and combinations of elements of the general rather than specific utility, and therefore I wish the following detailed description construed as being primarily for facilitating an understanding of the invention and not as a restriction or limitation as to the application or use of the invention. In the following detailed description I will refer, for example, to a common type of liquid dispenser such as is in wide use in dispensing gasoline, and the like. The dispenser illustrated includes, generally, a vertically disposed transparent cylindrical body 10, a bottom 11 closing the lower end of the body, and a top 12 closing the upper end of the body. I have shown the container mounted on a suitable pedestal base 13 and have shown a drain or dispensing conduit 14 connected with the interior of the container through the bottom 11. An overflow pipe 15 is arranged in the container to prevent the container being filled above a predetermined point or level. Ordinarily, containers of this type are equipped with a fixed scale which starts at the point or level determined by the overflow pipe and extends downwardly to a point near the bottom 11. The graduations are ordinarily such as to permit the liquid being dispensed from the container in gallons or fractions thereof gallons being the standard unit of volumetric measurement usually used in dispensing the class of produce mentioned.

The present invention provides means applicable to or in combination with a liquid container or carrier whereby indication is given to facilitate measurement or dispensing of liquid accurately on the basis of units of matter as distinguished from mere units of volume. The device comprises, generally, a thermostat or thermal control unit 16, and a variable scale or indicating means 17. In accordance with my invention the thermal control unit and indicating means may be in the nature of an attachment applicable to or adapted for association with a container or they may be applied as a permanent and original part of a construction involving a container.

It is a significant feature of the invention that the unit 16 and means 17 are capable of application to an existing container as an attachment and therefore I will refer to this form of the invention, it being understood that suitable modifications may be made when the invention is otherwise handled or applied. Further, it is essential, only as far as certain broad features of the invention are concerned, that the control unit 16 be operatively associated with the liquid container in order that it be subject to the same temperature changes as occur in the liquid in the container. In the preferred application of the invention, however, it is preferred to apply the unit 16 to the interior of the liquid container so that it is in direct relation to the liquid in the container thus providing a very simple, practical and effective combination.

In applying the invention to the type of container illustrated, or in applying it to a situation where the character of the liquid being handled permits, it is also convenient to have the indicating means 17 within the container and in direct association with the unit 16. This preferred arrangement of the indicating means 17 will be described:

The thermal control unit 16 may be of any suitable form or construction, it being essential primarily to provide a device actuated by temperature change in a manner to cause operation of the means 17. I find it advantageous to use a unit 16 of the type set forth in my copending application Meter, Serial Number 410,997, filed December 2, 1929, and in Letters Patent of the United States No. 1,505,306, granted to me August 19, 1924.

This unit includes, generally, a housing or body 18 and a projecting operating rod 19 actuated or controlled by the expansion and contraction of a body of liquid within the body 18. The liquid used preferably corresponds to or is the same as the liquid to be handled in the device. The details of the control unit 16 are not essential to the present invention and are fully set forth in the said patents, and therefore I have avoided unnecessary detail in the present disclosure.

In the form of the invention illustrated where the unit 16 and the means 17 are to be arranged within a container, for instance within the cylindrical body 10 of the container illustrated in Fig. 1, I provide a mounting base 20 and vertical frame members 21. The base 20 forms a means whereby the unit 16, means 17, and frame parts 21 may be mounted in the container, for example on the bottom 11 of the container. The frame parts 21 are in the nature of spaced vertical posts projecting upwardly from the base to a point adjacent the top 12 of the container where they carry a head 22. In the particular form of the invention illustrated I have shown a single control unit 16 carried by the base 20 and two indicating means 17 oppositely disposed or facing outwardly at diametrically opposite sides of the container body 10. In such case it is necessary, of course, to provide two sets of frame rods and two heads 22 to carry the two means 17. It will be obvious, of course, that the principles of the invention are embodied in a single indicating means 17, and therefore the following description will be confined to but one of such means, it being understood that the details of construction that are referred to may be applied to the several means 17 that may be associated with the control unit.

The indicating means 17 provided by the broader principles of the invention is in the nature of a variable scale and therefore comprises primarily a plurality of indicating parts associated for adjustment or variation in position with reference to each other. The relative movement of variation between the indicating parts is caused by motion derived from the operating rod 19 of the unit 16 and may be accomplished through various arrangements. For purpose of example I have chosen to set forth a lever means as such means lends itself to a simple, practical and dependable construction.

The indicating means illustrated comprises a plurality of indicating parts 25 one of which is fixed or stationary while the others are adjustable or variable with reference to the fixed indicator and to each other. The stationary indicator 25 is located at the point or level in the container determined by the overflow or drain pipe 15. In the construction shown each indicator 25 is in the form of an arrow carried on the end of a horizontally disposed arm 26. The upper arm 26 is supported from the head 22 of the frame construction by a bracket 27 and for purpose of convenience may have an indicator 25 projecting from each end, as shown in the drawings. The indicator 25 next below the stationary one just described may be carried on an arm 26, such as the one just described, and may be operatively connected or associated with the indicator first described by a pair of crossed levers A and B having their ends pivotally connected with the two arms 26 and being pivotally connected together at their point of intersection or crossing. The arms are pivotally connected together by a pivot pin 28. One end of the lever B is pivotally connected to one end of the upper arm 26 by a pin 29 while the lower end is slidably pivotally connected with the opposite end of the lower arm 26 by a pin 30 operating in a slot provided in the said opposite end of the lower arm 26. One end of the lever A is pivotally connected, by means of a pin 29, to the end of the lower arm 26 corresponding to that of the upper arm 26 receiving the pin 29. The other end of the lever A is slidably pivotally connected to the opposite end of the upper arm by a pivot pin 30 extending through a slot 31 in the said end of the upper arm. In a like manner the several successive arms 26 carrying indicators 25 are connected by pairs of levers A and B. It will be apparent that vertical movement of any of the arms 26 below the top or fixed arm will result in vertical movement of all of the arms 26 below the top arm 26 and it will be apparent that with the levers A and B of equal length throughout the system the relative movement between any two adjacent arms 26 will be the same, while the movement between any particular arm 26, removed from the upper arm 26, with reference to the upper arm 26 will be dependent upon the number of intervening arms 26 and will be an accumulation of the amount of the movement of the several intervening arms 26. Thus the lowermost arm 26 will have the greatest movement with reference to the uppermost arm 26, the movement of the lowermost arm 26 with reference to the uppermost arm 26 being as many times the movement between any two adjacent arms as there are intervening arms between the lower arm 26 and the upper arm 26.

In accordance with my invention the operating rod 19 of the control unit 16 is operatively connected with the indicating means 17. It will be apparent that the rod 19 may be operatively connected with a moving part of the means 17, for instance with one of the arms 26. In the form of the invention illustrated I operatively connect the rod 19 and the lowermost arms 26 of the means 17. In order to obtain the desired relation between the movement of the rod 19 and the movement of the lowermost arm 26 I provide a gear drive between the rod 19 and the lowermost arm 26. In the particular construction illustrated the rod 19 has an extension 19ª in the form of a rack. The rack 19ª meshes with a gear 40 fixed on a rotatable shaft 41. The shaft 41 carries and drives a gear 42 larger in its diameter than the gear 40. The gear 42 meshes with a vertically movable rack 43 connected to the arm 26 to be operated by a screw 71. The connection between the rack 45 and the arm 26 may be a slotted connection whereby the means 16 and 17 may be adjusted. A tension spring 50 is shown connected between the upper end of the rack 43 and the head 22 of the frame. The spring operates to keep the mechanism above described under yielding pressure in one direction and thus eliminates inaccuracies due to lost play in the mechanism.

In practice I may design the mechanism to compensate for variations in the action of the parts due to their expansion and contraction caused by temperature changes, or I may form the parts of materials having little if any expansion and contraction within the temperature range under which the device is to operate.

From the foregoing description it is believed that the operation of the device will be fully understood. With the parts provided by my invention in place in a fluid container, as illustrated throughout the drawings, the temperature of the liquid in the container is communicated to the control unit 16 so that the liquid or other responsive element in the unit 16 has the same temperature as the liquid in the container. For a given temperature condition the operating rod 19 of the unit will be in a definite position causing a corresponding definite positioning of the various parts of the indicating means 17. As temperature variations occur in the liquid in the container, corresponding changes occur in the liquid in the unit 17 causing movement or change in position of the rod 19 which in turn is communicated to the indicating means 17.

It will be obvious that the various parts can be related and proportioned so that the indicating means varies to indicate volume corrected to correspond accurately to definite unit of matter. In the arrangement provided by the preferred application of the invention, the indicating means 17 is within the container, being within or behind the wall of the transparent cylindrical body 10 so that an operator can readily view the indicating parts 25.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. In combination, a liquid container, a plurality of spaced parts for indicating the quantities of liquid in the container at different levels in the container, means supporting the said parts whereby their spacing may be varied, a thermal actuating unit responsive to the temperature of the liquid for operating said means to proportionally vary the spacing of said parts relative to variations in the temperature of the liquid, and means operatively connecting the means with said unit.

2. In combination, a liquid container, a plurality of spaced parts for indicating the quantities of liquid in the container at different levels in the container, lever means supporting the said parts whereby their spacing may be varied, a thermal actuating unit responsive to the temperature of the liquid for operating said means to proportionally vary the spacing of said parts relative to variations in the temperature of the liquid, and means operatively connecting the means with said unit.

3. In combination, a liquid container having a transparent part, a member in the container visible through said transparent part for indicating the quantity of liquid in the container, means supporting the member for vertical movement, and temperature responsive actuating means for operating said supporting means to vary the position of the member relative to variations in the temperature of the liquid.

4. In combination, a liquid container having a transparent part, a variable quantity indicating scale arranged in the container including spaced arms visible through said transparent part, and means interconnecting the arms whereby their spacing may be varied, a thermal operating unit in the container in contact with the liquid for actuating the said means to vary the spacing of the arms upon variations in the temperature of the liquid in the container, and an operative drive connecting the scale and unit.

5. An attachment for a liquid dispenser having a liquid container which includes a variable scale for indicating the quantity of liquid in the container, the scale including spaced indicating members, and means for varying the spacing of the members, and thermally responsive means for operating the said means and being thermally related to the liquid in the container.

6. An attachment for a liquid dispenser having a liquid container which includes a variable scale for indicating the quantity of liquid in the container, the scale including spaced indicating members, and means for varying the spacing of the members, and thermally responsive means for operating the said means and adapted to be arranged in the container to be controlled by the temperature of the liquid in the container.

7. An attachment for a liquid dispenser having a liquid container with a transparent part including a variable scale adapted to be arranged in the container and including spaced members to indicate the quantities of liquid in the container at spaced levels, the scale being adapted to be arranged so that the members are visible through the said transparent part, and means for varying the spacing of the members; and temperature responsive actuating means for the said means and operatively connected therewith adapted to be arranged in the container with the scale to be controlled by the temperature of the liquid in the container.

8. In combination, a liquid container having an overflow outlet, a variable scale connected with the container and having an indicating part in fixed position with reference to the overflow outlet, and a movable indicating part below the fixed part, and temperature responsive actuating means operating the movable indicating part in proportion as the density of liquid in the container varies with temperature change.

9. In combination, a liquid container having an overflow outlet, a variable scale connected with the container and including an indicating part in fixed position with reference to the overflow outlet, and a plurality of movable indicating parts below the fixed part each movable relative to the other and one movable relative to the fixed part, and temperature responsive means operating the movable indicating parts in proportion as the density of liquid in the container varies with temperature change.

10. In combination, a liquid container having an overflow, a variable scale including a stationary indicating part, a movable indicating part below the stationary part, and a lever connection between the indicating parts, the scale being connected with the container with the stationary part in fixed position with reference to the overflow, and temperature responsive means operating the movable indicating part in proportion as the density of liquid in the container varies with temperature change.

11. In combination, a liquid container having an overflow, a variable scale including an indicating part mounted in fixed position with reference to the overflow, a plurality of movable indicating parts in a series below the fixed part, and a lever system interconnecting the indicating parts, and temperature responsive means operatively connected with the lever system operable to vary the relative positioning of the indicating parts in proportion as the density of liquid in the container varies with temperature change.

12. In combination, a liquid container having an overflow, a variable scale including an indicating part mounted in fixed position with reference to the overflow, and a movable indicating part below the fixed part, and temperature responsive actuating means operatively connected with the movable indicating part to move it in proportion as the density of liquid in the container varies with temperature change.

13. In combination, a liquid container having an overflow, a variable scale including an indicating part mounted in fixed position with reference to the overflow, a plurality of movable indicating parts in a series below the fixed part, and levers interconnecting the indicating parts, and temperature responsive actuating means operatively connected with the levers for operating the levers to vary the relative positioning of the indicating parts in proportion as the density of liquid in the container varies with temperature change.

14. In combination, a liquid container having an overflow, a variable scale including an indicating part mounted in fixed position with reference to the overflow, a plurality of movable indicating parts, and mechanical means connecting the indicating parts, a temperature responsive operating unit controlled by the temperature of the liquid in the container, and a drive connecting the unit and said means.

15. In combination, a liquid container having an overflow, a variable scale including an indicating part mounted in fixed position with reference to the overflow, a plurality of movable indicating parts, and levers connecting the indicating parts, a thermally responsive operating unit controlled by the temperature of the liquid in the container, and a gear drive connecting the unit and levers.

16. In combination, a liquid container having an overflow, a variable scale including an indicating part mounted in fixed position with reference to the overflow, a plurality of indicating parts, and levers connecting the indicating parts, a temperature responsive operating unit responsive to the temperature of the liquid in the container, a mechanical drive connecting the unit and levers, and means whereby the drive is normally yieldingly held under pressure in one direction.

17. In combination, a liquid container having an overflow, a variable scale including an indicating part mounted in fixed position with reference to the overflow, a plurality of indicating parts and levers connecting the indicating parts, a temperature responsive operating unit responsive to the temperature of the liquid in the container, a mechanical drive connecting the unit and levers, and spring means whereby the drive is normally yieldingly held under pressure in one direction.

18. In combination, a liquid container, a variable scale indicating the quantity of liquid in the container, a temperature responsive operating unit, and means operatively connecting the unit with the scale, the scale and unit being located in the container, the unit being responsive to the temperature of the liquid in the container.

19. In combination, a liquid container, a variable scale indicating the quantity of liquid in the container, a temperature responsive operating unit, and means operatively connecting the unit with the scale, the thermal unit being located in the container and controlled by the temperature of the liquid in the container.

20. In combination, a liquid container, a plurality of indicating parts for indicating the quantity of liquid in the container, a plurality of pivotally connected levers interconnecting the parts and operable to move the parts relative to each other, a temperature responsive actuating mechanism, and means operatively connecting the mechanism with the levers to operate them.

21. In combination, a liquid container; a scale for indicating the quantity of liquid in the container including an indicating member, and means supporting the member for movement relative to the container; a thermally responsive element for actuating the said means to shift the member relative to the container, the element being controlled by the temperature of the liquid in the container, and means operatively connecting the element and said means.

22. In combination, a liquid container, a variable scale for indicating the quantity of liquid in the container comprising a vertical series of horizontally parallel and relatively movable arms, the upper arm of the series being stationary; means connecting the arms whereby the spaces between them will be maintained equal; a thermal operating unit, and means connecting the unit with the lower arm of the series whereby said arm will be elevated proportionally to any fall in temperature of the liquid in the container and will be lowered proportionally to any rise in temperature of liquid in the container.

In witness that I claim the foregoing I have hereunto subscribed my name this 15 day of October, 1928.

CARLOS J. BASSLER.